US008006612B2

(12) United States Patent
Lin

(10) Patent No.: US 8,006,612 B2
(45) Date of Patent: Aug. 30, 2011

(54) HOT DRINK MAKER

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 416 days.

(21) Appl. No.: 12/388,892

(22) Filed: Feb. 19, 2009

(65) Prior Publication Data
US 2010/0206176 A1 Aug. 19, 2010

(51) Int. Cl.
A47J 31/40 (2006.01)
A47J 31/06 (2006.01)
A47J 31/02 (2006.01)
A47J 31/057 (2006.01)
A23F 3/00 (2006.01)

(52) U.S. Cl. ............. 99/282; 99/283; 99/299; 99/306; 99/307; 99/323.3

(58) Field of Classification Search ............ 99/306, 99/304, 307, 299, 280, 281, 282, 283, 323.3
See application file for complete search history.

(56) References Cited

U.S. PATENT DOCUMENTS

| 3,693,535 | A | * | 9/1972 | Abel, Jr. | 99/282 |
|---|---|---|---|---|---|
| 3,771,432 | A | * | 11/1973 | Karlen | 99/304 |
| 3,793,933 | A | * | 2/1974 | Weber | 99/283 |
| 3,844,206 | A | * | 10/1974 | Weber | 99/282 |
| 3,878,360 | A | * | 4/1975 | Augustine et al. | 392/444 |
| 5,957,036 | A | * | 9/1999 | Warner et al. | 99/299 |
| 5,964,143 | A | * | 10/1999 | Driscoll et al. | 99/299 |
| 6,755,120 | B1 | * | 6/2004 | Lin | 99/323.3 |
| 6,827,002 | B1 | * | 12/2004 | Lin | 99/286 |
| 6,971,304 | B1 | * | 12/2005 | Lin | 99/295 |
| 6,997,104 | B1 | * | 2/2006 | Lin | 99/323.3 |
| 7,252,033 | B1 | * | 8/2007 | Lin | 99/286 |
| 7,661,353 | B2 | * | 2/2010 | Lin | 99/299 |
| 2010/0199848 | A1 | * | 8/2010 | Lin | 99/286 |

* cited by examiner

Primary Examiner — Sebastiano Passaniti
(74) Attorney, Agent, or Firm — Alan Kamrath; Kamrath & Associates PA

(57) ABSTRACT

A hot drink maker is provided. The hot drink maker includes a heating device for making various hot drinks. The heating device can be set in advance with a desired temperature and time for making a hot drink so that the heating device heats water to the desired temperature and pumps the heated water into a steeping space in which a bag containing a raw material of the hot drink is placed. When the set time is up, a cam is driven to rotate, thereby pushing a pushing rod upward. Consequently, a seesaw element resiliently engaged with a plug rod at an end of an outlet of a steeping chamber is tilted so as to discharge a finished hot drink prepared by steeping into an adjacent pitcher along the lowered plug rod, and thus the hot drink is made conveniently.

7 Claims, 10 Drawing Sheets

HOT DRINK MAKER

BACKGROUND OF THE INVENTION

1. Technical Field

The present invention relates to a hot drink maker essentially comprising a heating device for making various hot drinks. The heating device can be set in advance with a desired temperature and time for making a hot drink so that the heating device heats water to the desired temperature and pumps the heated water into a steeping space in which a bag containing a raw material of the hot drink is placed. When the set time is up, a cam is driven to rotate, thereby pushing a pushing rod upward. Consequently, a seesaw element resiliently engaged with a plug rod at an end of an outlet of a steeping chamber is tilted so as to discharge a finished hot drink prepared by steeping into an adjacent pitcher along the lowered plug rod, and various hot drinks can be thus made conveniently.

2. Description of Related Art

Nowadays, heating devices for making various hot drinks are available in a variety of configurations. Ideally, such heating devices are configured to bring convenience to general users by enabling preparation of hot drinks through simple operation and yet giving the finished hot drinks the expected tastes. For example, a coffeepot is disclosed in U.S. Pat. No. 6,755,120 B1, which is titled "COFFEEPOT" and issued on Jun. 29, 2004. According to this patented coffeepot, a handle assembly is screwed onto a body of the coffeepot and has a hollow ring seat assembled with a lid connecting assembly. The lid connecting assembly is formed internally with a liquid passageway and has a top surface eccentrically and concavely formed with a funnel-shaped channel for receiving a check valve therein. A passageway opening/closing unit penetrates upward through the lid connecting assembly and a central hole of an abutment assembly disposed above and adjacent to an upper end of the lid connecting assembly. The opening/closing unit jutting out of the center of the abutment assembly has an upper end engaged with a push member which is provided externally and coupled with an inner side of a lid. The lid has a periphery retained by the lid connecting assembly. Coffee is poured out of the coffeepot having the aforesaid configuration by pressing down the push member, which in turn drives the opening/closing unit to move a distance downward. Thus, a coffeepot lid capable of pouring liquid out conveniently and safely and being easily closed is achieved.

BRIEF SUMMARY OF THE INVENTION

The present invention provides a heating device having a novel configuration based on the existing heating devices for making various hot drinks. It is intended that the heating device of the present invention can be set in advance with a desired temperature and time for making a hot drink so that the heating device heats water to the desired temperature and pumps the heated water into a steeping space in which a bag containing a raw material of the hot drink is placed. When the set time is up, a cam is driven to rotate, thereby pushing a pushing rod upward. Consequently, a seesaw element resiliently engaged with a plug rod at an end of an outlet of a steeping chamber is tilted so as to discharge a finished hot drink prepared by steeping into an adjacent pitcher along the lowered plug rod, and various hot drinks can be thus made conveniently.

A primary objective of the present invention is to provide a heating device for making various hot drinks, wherein the heating device has an internal water tank for storing and boiling tap water, and a pump is assembled under the internal water tank for pumping water reaching a preset temperature from the internal water tank through a tube into a steeping chamber installed above the internal water tank. The steeping chamber is partitioned internally so as to form a receiving space for receiving a bag containing a raw material of a hot drink, wherein the space is surrounded by a peripheral wall having a plurality of mesh openings. The steeping chamber has an end formed with an outlet, which is fitted therein with a plug rod constantly and resiliently pushing downward. A seesaw element is pivotally provided adjacent to an end of a main body of the heating device. The seesaw element has an end restrained by a resilient element disposed between a projection extended from the internal water tank and the end of the seesaw element such that an opposite end of the seesaw element is constantly and resiliently pushed upward against the plug rod located thereabove so as to keep the steeping chamber closed. A cam to be driven and controlled by at least two sensors is assembled under the main body of the heating device. A pushing rod is fitted in a hollow frame located above the cam and has an end corresponding in position to the seesaw element. A resilient element is disposed between an upper end of the pushing rod and a corresponding end of the main body so that the pushing rod is constantly and resiliently pushed downward. When a set steeping time is up, the cam is driven to rotate, thereby pushing the pushing rod upward and thus tilting the seesaw element resiliently engaged with the plug rod at the end of the outlet of the steeping chamber. As a result, a finished hot drink prepared by steeping is discharged into an adjacent pitcher along the lowered plug rod, and various hot drinks can be thus made conveniently.

A second objective of the present invention is to provide the foregoing heating device for making various hot drinks, wherein a heater is embedded at a bottom of the internal water tank for storing and boiling tap water of the heating device.

A third objective of the present invention is to provide the foregoing heating device for making various hot drinks, wherein a temperature sensor is assembled in the internal water tank for storing and boiling tap water of the heating device.

A fourth objective of the present invention is to provide the foregoing heating device for making various hot drinks, wherein the plug rod fitted in the outlet of the steeping chamber installed above the internal water tank of the heating device is an element having a middle section having a crisscross sectional shape.

A fifth objective of the present invention is to provide the foregoing heating device for making various hot drinks, wherein a second heater is assembled to a bottom of the steeping chamber installed above the internal water tank of the heating device and is configured for maintaining a temperature of the hot drink in the steeping chamber.

A sixth objective of the present invention is to provide the foregoing heating device for making various hot drinks, wherein the main body of the heating device has a section located adjacent to the outlet at the end of the steeping chamber and formed with an aperture for allowing a hot drink to flow out into the adjacent pitcher.

A seventh objective of the present invention is to provide the foregoing heating device for making various hot drinks, wherein the main body of the heating device has an acting side assembled with a water temperature setting button for setting the temperature sensor in the internal water tank and a time setting button for setting a steeping time for the bag containing the raw material of the hot drink in the steeping chamber.

BRIEF DESCRIPTION OF THE SEVERAL VIEWS OF THE DRAWINGS

The invention as well as a preferred mode of use, further objectives, and advantages thereof will be best understood by referring to the following detailed description of an illustrative embodiment in conjunction with the accompanying drawings, wherein.

DETAILED DESCRIPTION OF THE INVENTION

Figure 1:
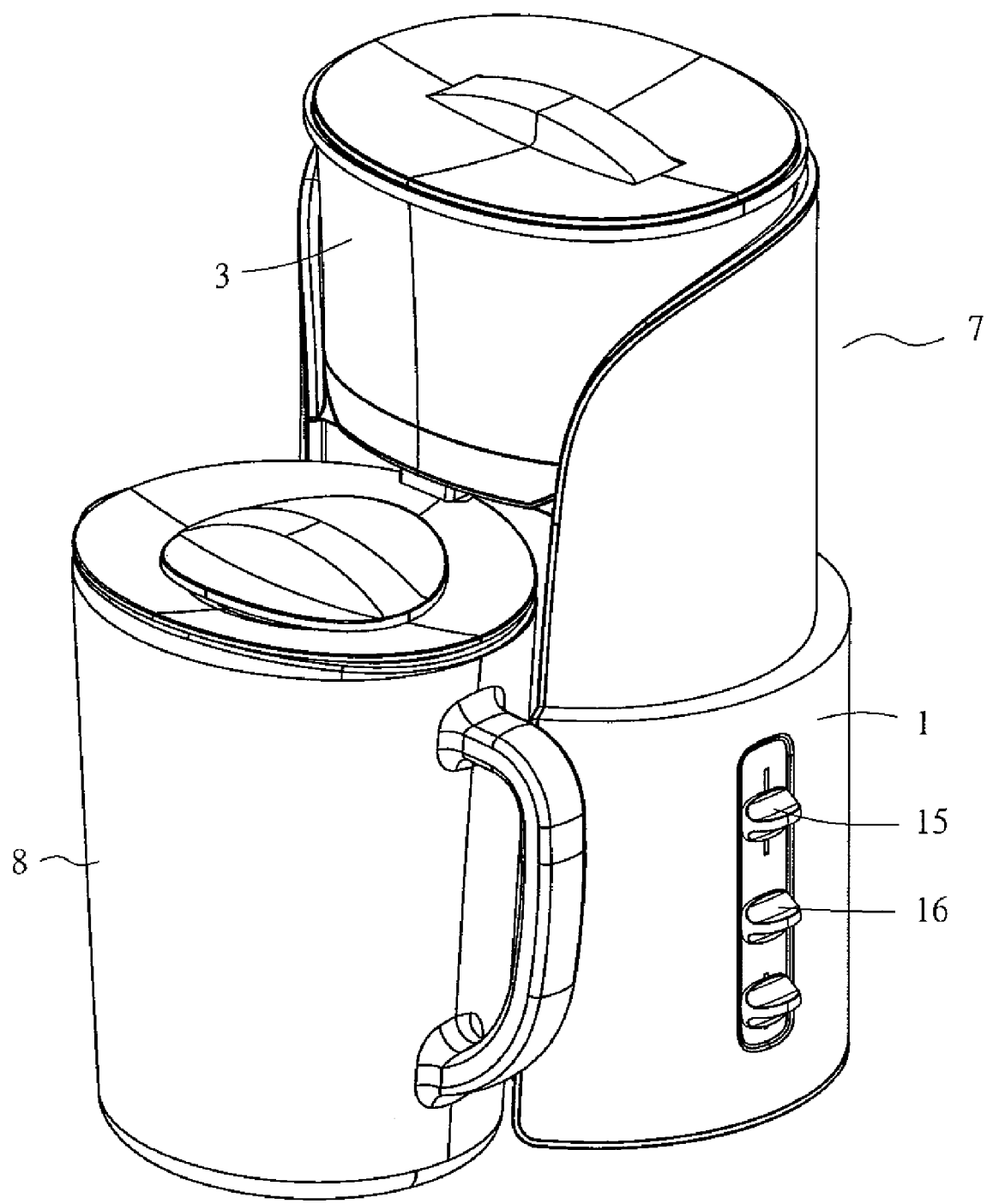
FIG. 1 is a perspective view of a hot drink maker according to the present invention.
Figure 2:
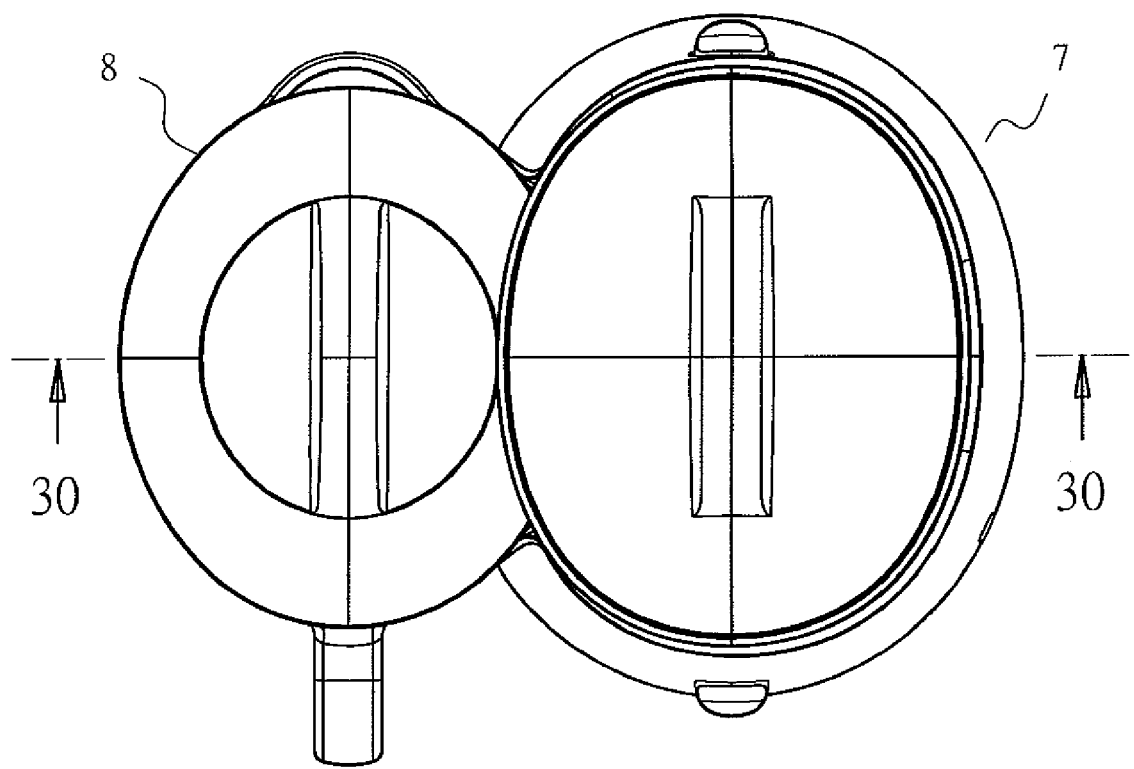
FIG. 2 is a top view of the hot drink maker according to the present invention.
Figure 3:
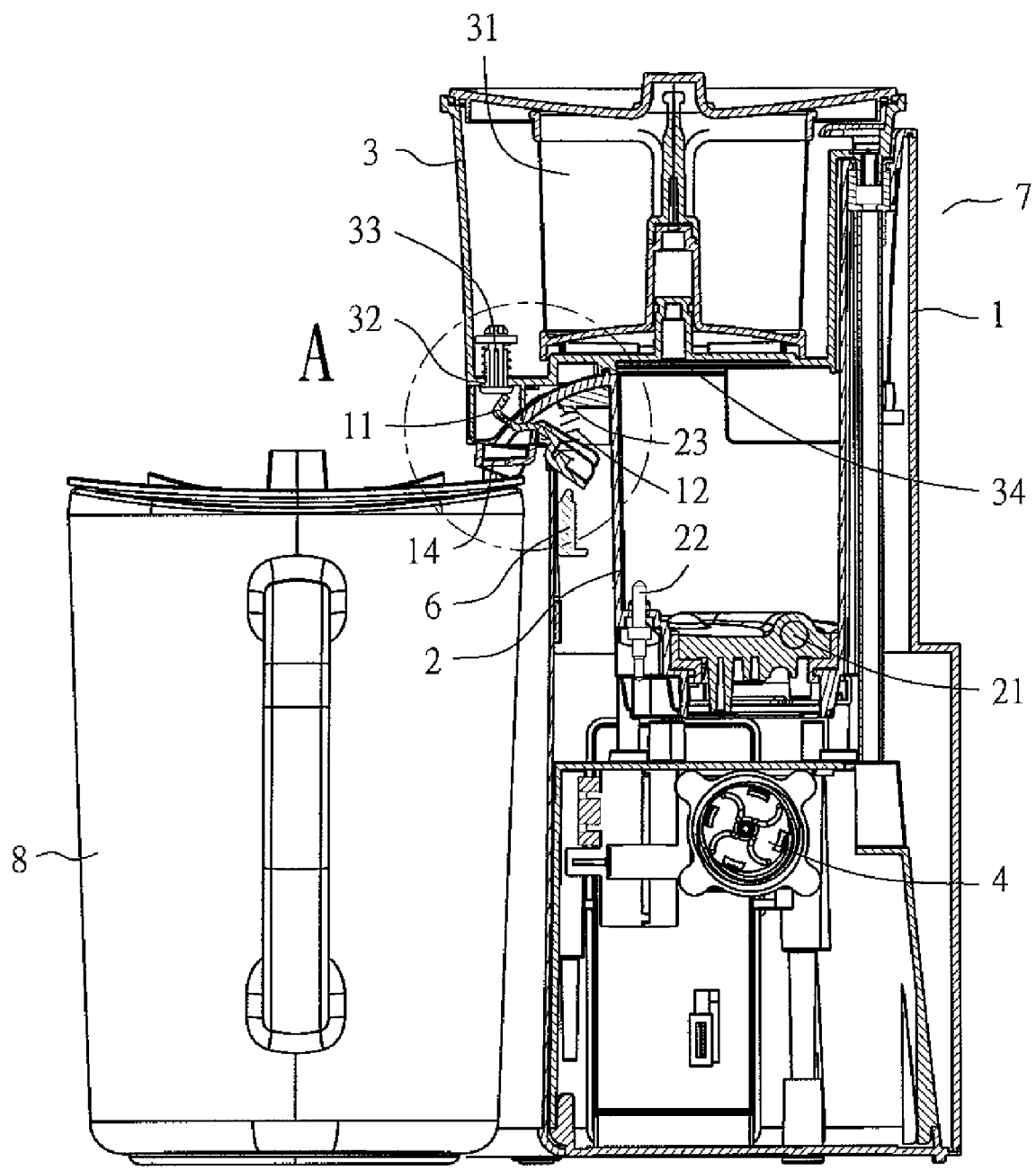
FIG. 3 is a sectional view taken along line 30-30 of FIG. 2.

Referring to FIGS. 1 through 3, a hot drink maker according to the present invention essentially comprises a heating device 7 for making various hot drinks. The heating device 7 comprises a main body 1 assembled therein with an internal water tank 2. A steeping chamber 3 is installed at an upper end of the internal water tank 2. A pitcher 8 is placed at a side of the main body 1 adjacent to where the steeping chamber 3 is installed.

Figure 5:
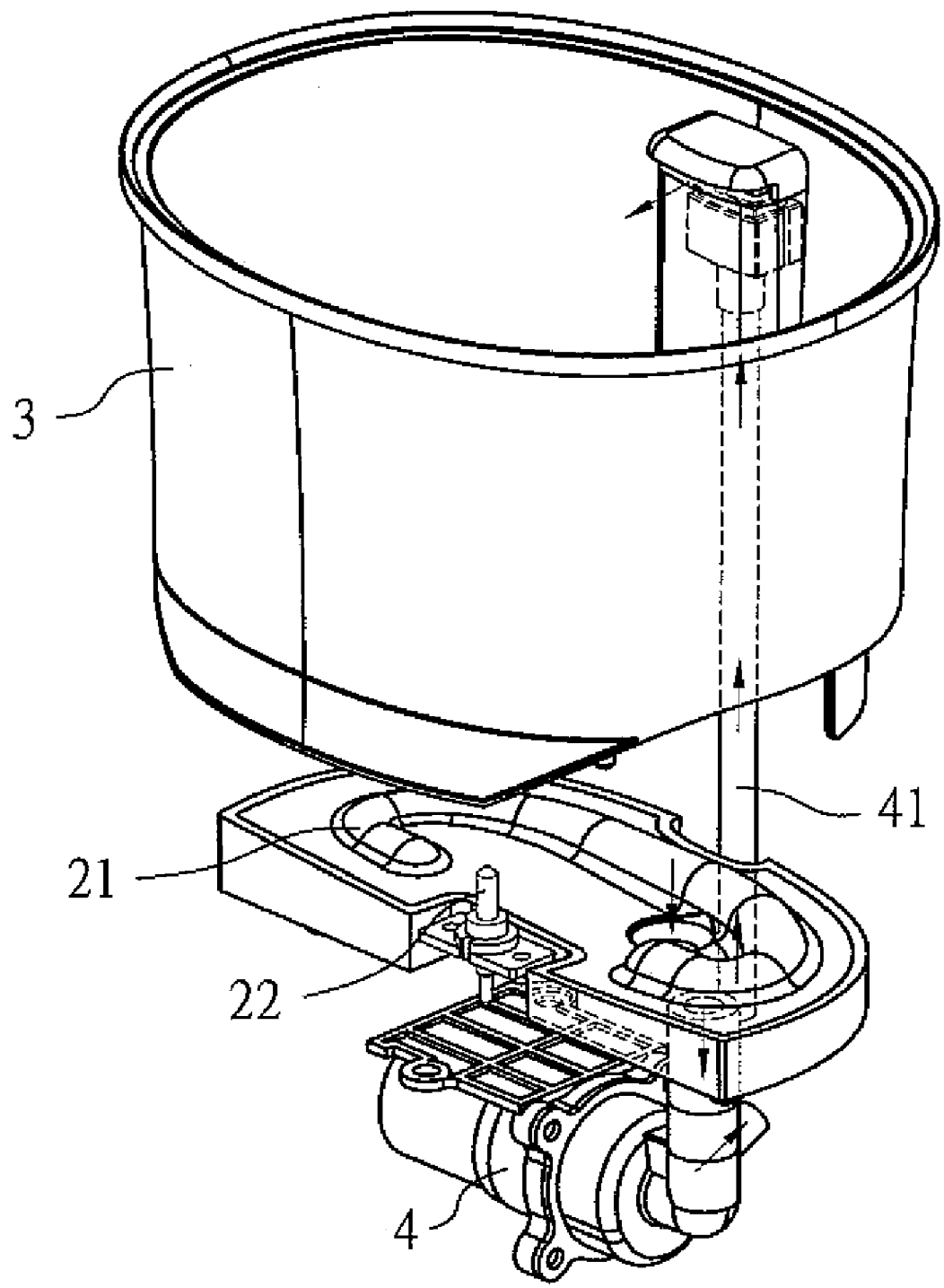
FIG. 5 is a detailed perspective view of an internal water tank and the steeping chamber of the hot drink maker according to the present invention.

The internal water tank 2 of the heating device 7 is configured for storing and boiling tap water. A pump 4, as shown in FIG. 3, is assembled under the internal water tank 2 for pumping water reaching a preset temperature from the internal water tank 2 through a tube 41 into the steeping chamber 3 installed above the internal water tank 2, as shown in FIG. 5. A heater 21 is embedded at a bottom of the internal water tank 2, and a temperature sensor 22 is assembled to an end of the heater 21, as shown in FIG. 3.

Figure 3A:
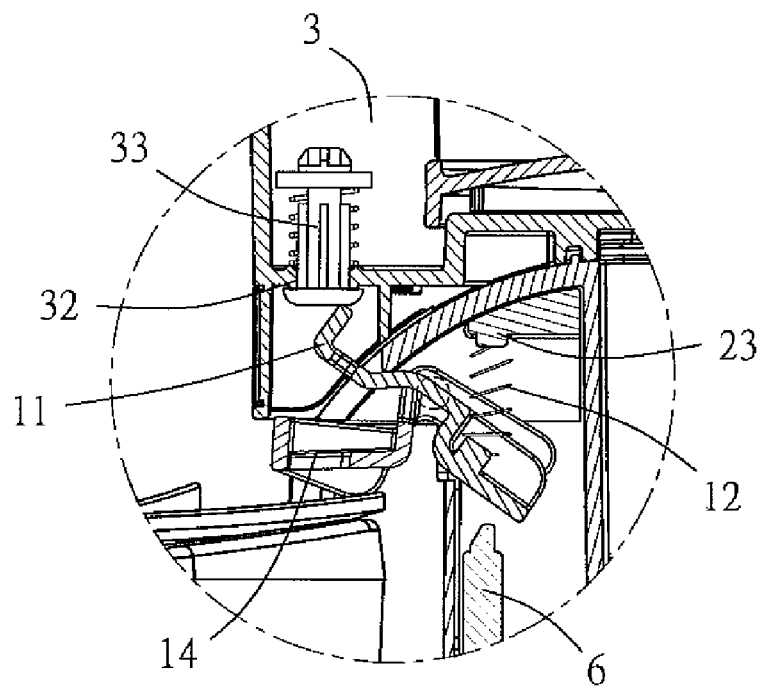
FIG. 3A is an enlarged view of area A of FIG. 3.

The steeping chamber 3 is partitioned internally so as to form a receiving space 31 for receiving a bag containing a raw material of a hot drink, wherein the space 31 is surrounded by a peripheral wall having a plurality of mesh openings. The steeping chamber 3 has an end formed with an outlet 32, which is fitted therein with a plug rod 33 constantly and resiliently pushing downward, as shown in FIGS. 3 and 3A. The plug rod 33 fitted in the outlet 32 of the steeping chamber 3 is an element having a middle section having a crisscross sectional shape. A second heater 34 is assembled to a bottom of the steeping chamber 3 for maintaining the temperature of a hot drink in the steeping chamber 3. In addition, a seesaw element 11 is pivotally provided adjacent to an end of the main body 1 of the heating device 7. The seesaw element 11 has an end restrained by a resilient element 12 disposed between a projection 23 extended from the internal water tank 2 and the end of the seesaw element 11 such that an opposite end of the seesaw element 11 is constantly and resiliently pushed upward against the plug rod 33 located thereabove so as to keep the steeping chamber 3 closed.

Figure 6:
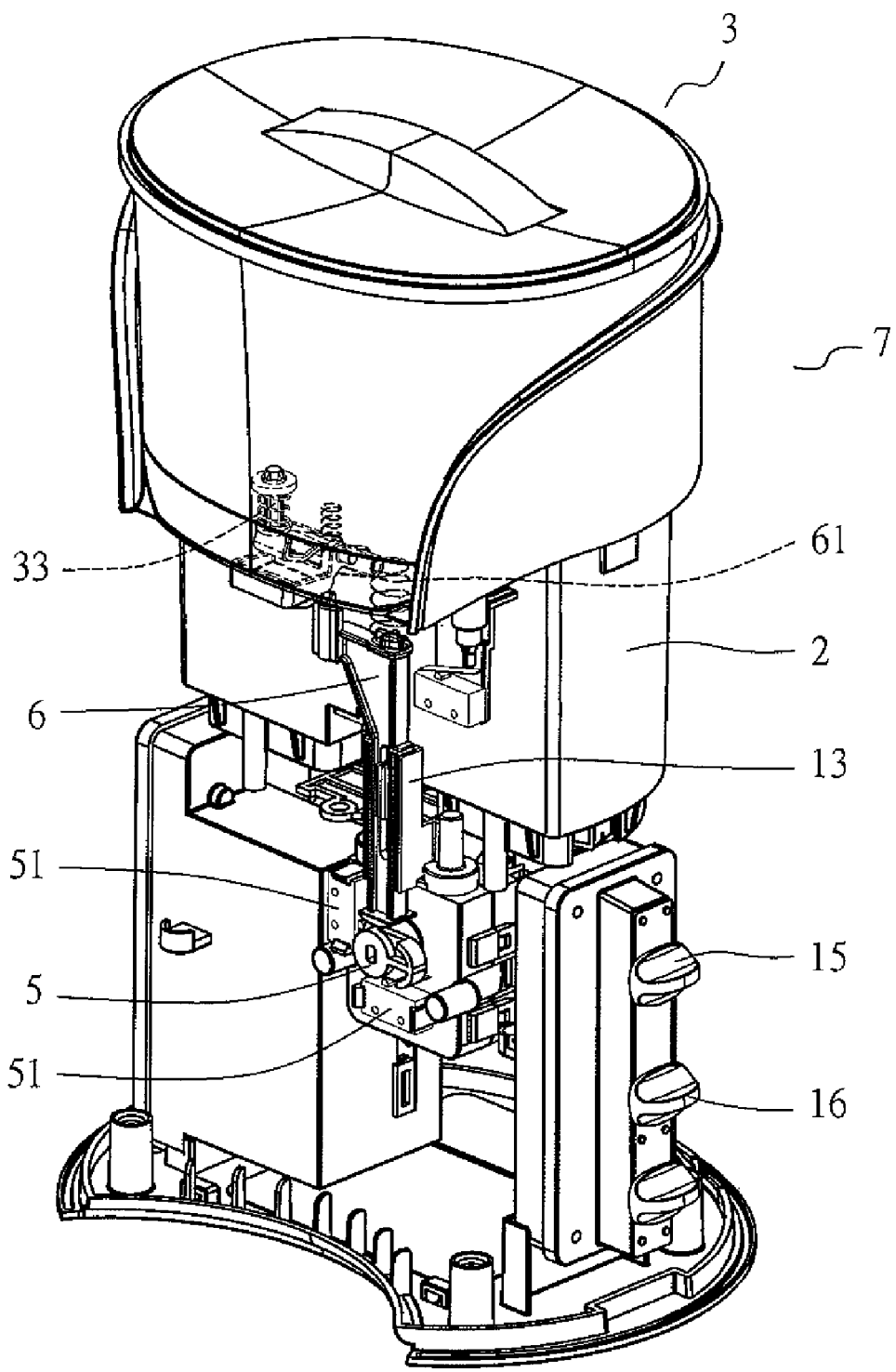
FIG. 6 is a detailed perspective view showing internal structure of a main body of a heating device of the hot drink maker according to the present invention.
Figure 7:
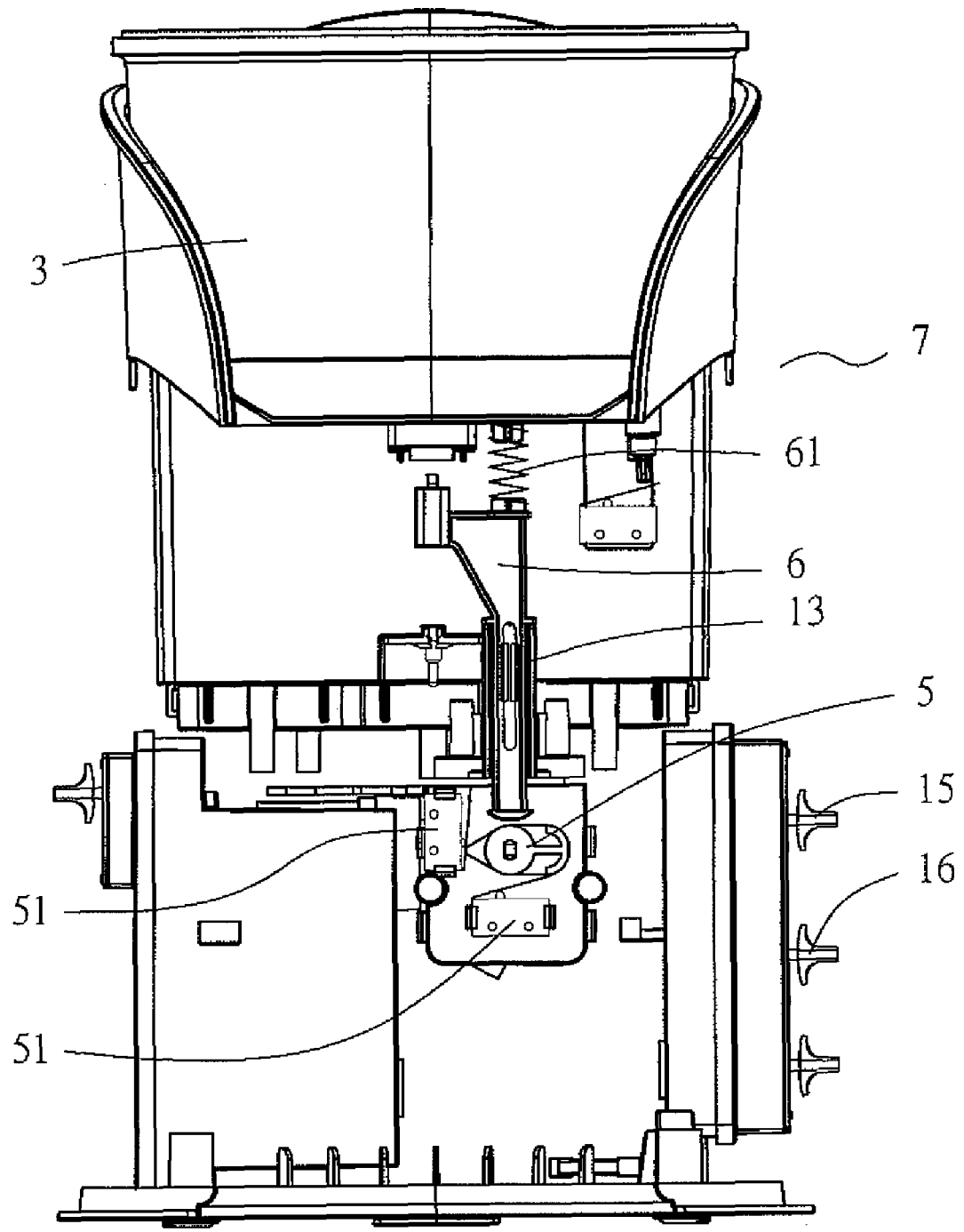
FIG. 7 is a detailed side view showing the internal structure of the main body of the heating device of the hot drink maker according to the present invention.

Referring to FIGS. 6 and 7, a cam 5 to be driven and controlled by at least two sensors 51 is assembled under the main body 1 of the heating device 7. A pushing rod 6 is fitted in a hollow frame 13 located above the cam 5 and has an end corresponding in position to the seesaw element 11, as shown in FIG. 3A. A resilient element 61 is disposed between an upper end of the pushing rod 6 and a corresponding end of the main body 1 so that the pushing rod 6 is constantly and resiliently pushed downward. The main body 1 of the heating device 7 has a section located adjacent to the outlet 32 at the end of the steeping chamber 3 and formed with an aperture 14 for allowing a hot drink to flow out into the adjacent pitcher 8. Besides, as shown in FIG. 6, the main body 1 has an acting side assembled with a water temperature setting button 15 for setting the temperature sensor 22 in the internal water tank 2 and a time setting button 16 for setting a steeping time for the bag containing the raw material of the hot drink in the steeping chamber 3.

Figure 9A:
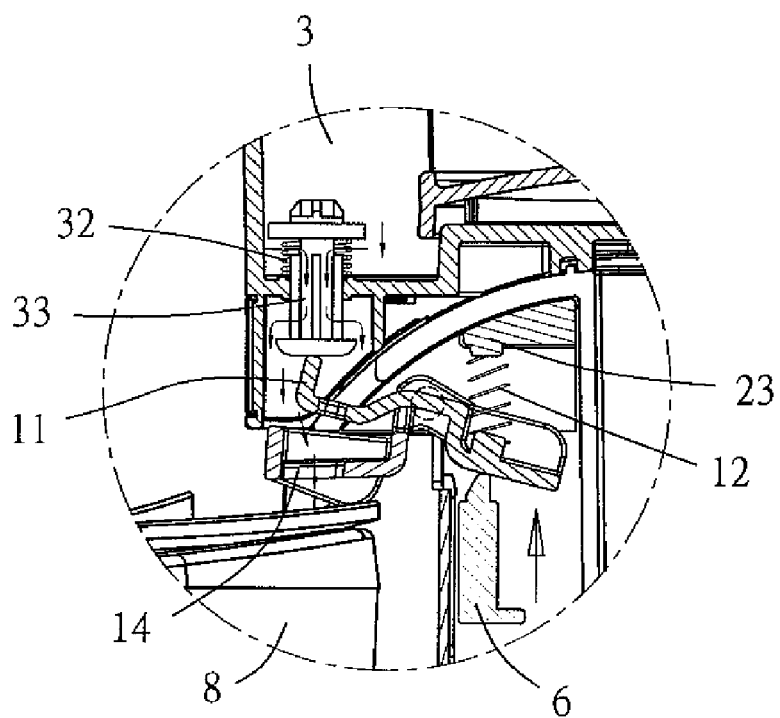
FIG. 9A is an enlarged view of area A of FIG. 9.
Figure 4:
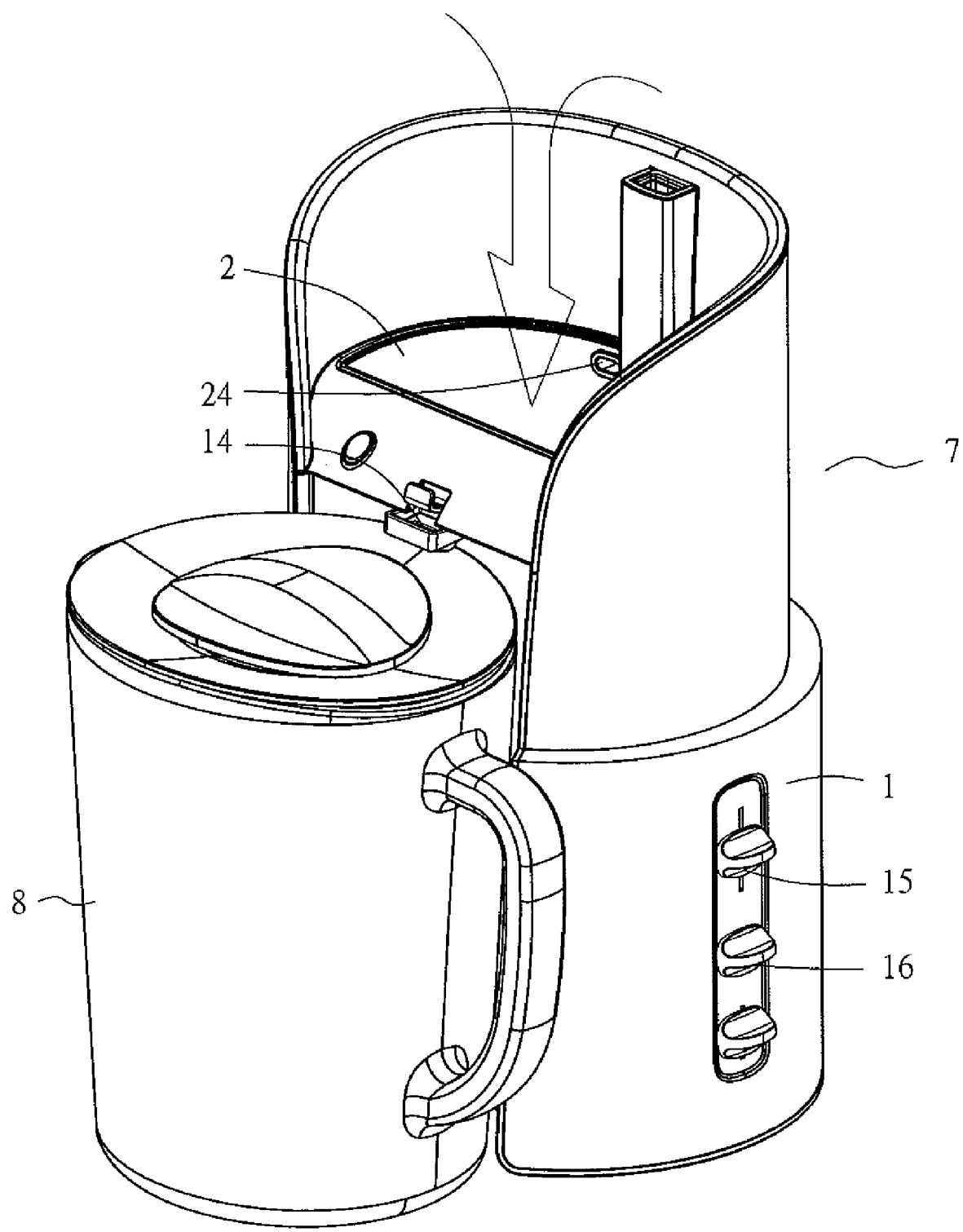
FIG. 4 is another perspective view of the hot drink maker according to the present invention, wherein a steeping chamber has been removed.
Figure 8:
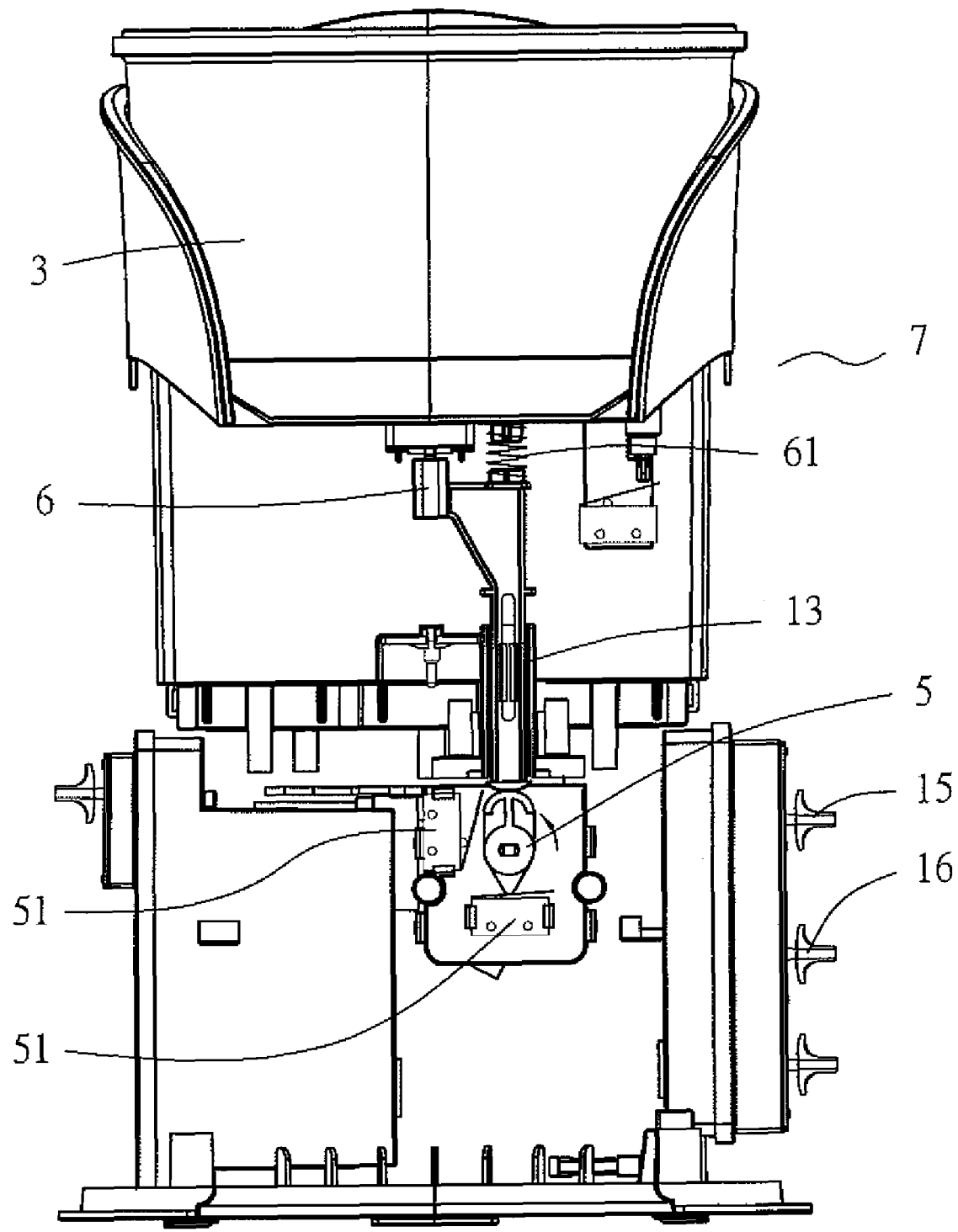
FIG. 8 illustrates how a cam of the hot drink maker according to the present invention drives a pushing rod upward.
Figure 9:
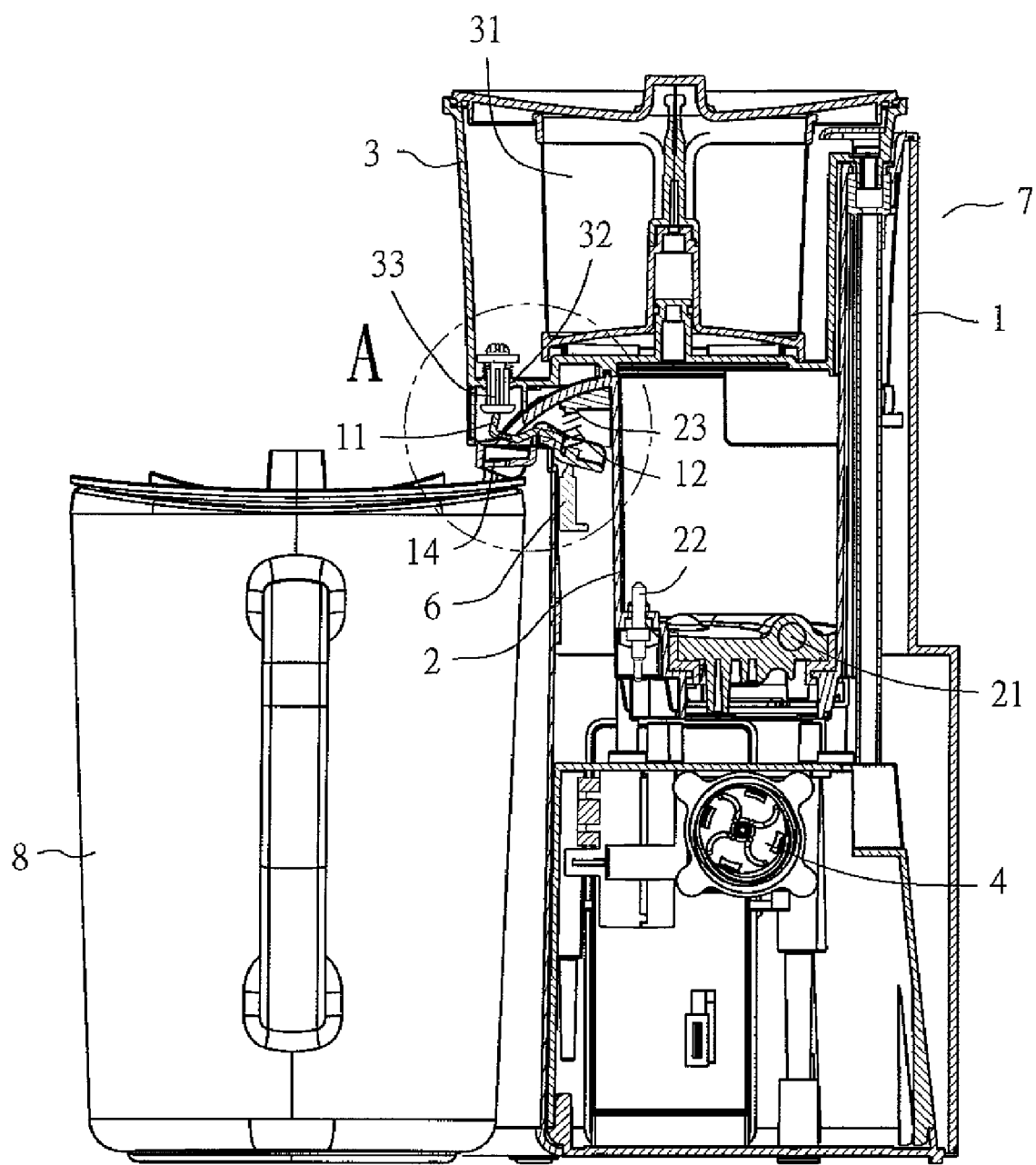
FIG. 9 illustrates how a plug rod of the steeping chamber of the hot drink maker according to the present invention is lowered.

When it is desired to use the heating device 7 shown in FIG. 1 and having the aforesaid configuration to make a hot drink, the steeping chamber 3 at the upper end of the main body 1 is removed, as shown in FIG. 4, so as to pour water into the internal water tank 2. (An excess of water poured into the internal water tank 2 will flow out through an overflow opening 24.) Then, the desired water temperature and steeping time for the hot drink to be made are set by means of the water temperature setting button 15 and the time setting button 16 at the acting side of the main body 1. Afterward, the heater 21 in the internal water tank 2 heats the water therein, as shown in FIG. 3. When it is detected by the temperature sensor 22 in the internal water tank 2 that the water has been heated to the presetting temperature, the pump 4 assembled under the internal water tank 2 is activated to pump the hot boiled water inside the internal water tank 2 through the tube 41 into the steeping chamber 3 installed above the internal water tank 2, as shown in FIG. 5 so that the bag containing the raw material of the hot drink and placed in the receiving space 31 is infused by the hot boiled water. When the set steeping time is up, the cam 5 is driven to rotate, thereby pushing the pushing rod 6 upward, as shown in FIGS. 8 and 9, and thus tilting the seesaw element 11 resiliently engaged with the plug rod 33 at the end of the outlet 32 of the steeping chamber 3. As a result, the finished hot drink prepared by steeping is discharged into the adjacent pitcher 8 along the lowered plug rod 33, as shown in FIG. 9A, and thus the hot drink is made conveniently.

The invention claimed is:

1. A hot drink maker, essentially comprising a heating device for making various hot drinks, the heating device comprising a main body assembled therein with an internal water tank, a steeping chamber being installed at an upper end of the internal water tank, a pitcher being placed at a side of the main body adjacent to where the steeping chamber is installed, the hot drink maker being characterized in:

a pump being assembled under the internal water tank for storing and boiling tap water of the heating device and being configured for pumping water which has reached a preset temperature from the internal water tank through a tube into the steeping chamber installed above the internal water tank;

the steeping chamber being partitioned internally so as to form a receiving space for receiving a bag containing a raw material of a hot drink, the space being surrounded by a peripheral wall having a plurality of mesh openings, the steeping chamber having an end formed with an outlet fitted therein with a plug rod constantly and resiliently pushing downward, a seesaw element being pivotally provided adjacent to an end of the main body of the heating device, the seesaw element having an end restrained by a resilient element disposed between a projection extended from the internal water tank and the end of the seesaw element such that an opposite end of the seesaw element is constantly and resiliently pushed upward against the plug rod located thereabove so as to keep the steeping chamber closed; and a cam to be driven and controlled by at least two sensors being assembled under the main body of the heating device, a pushing rod being fitted in a hollow frame above the cam and having an end corresponding in position to the seesaw element, another resilient element being disposed between an upper end of the pushing rod and a corresponding end of the main body so that the pushing rod is constantly and resiliently pushed downward;

wherein when a set steeping time is up, the cam is driven to rotate, thereby pushing the pushing rod upward and thus tilting the seesaw element resiliently engaged with the plug rod at the end of the outlet of the steeping chamber so that a finished hot drink prepared by steeping is discharged into the adjacent pitcher along the lowered plug rod, and thus the hot drink is made conveniently.

2. The hot drink maker of claim 1 wherein a heater is embedded at a bottom of the internal water tank for storing and boiling tap water of the heating device for making various hot drinks.

3. The hot drink maker of claim 1, wherein a temperature sensor is assembled in the internal water tank for storing and boiling tap water of the heating device for making various hot drinks.

4. The hot drink maker of claim 1, wherein the plug rod fitted in the outlet of the steeping chamber installed above the internal water tank of the heating device for making various hot drinks is an element having a middle section having a crisscross sectional shape.

5. The hot drink maker of claim 1, wherein a second heater is assembled to a bottom of the steeping chamber installed above the internal water tank of the heating device for making various hot drinks and is configured for maintaining a temperature of the hot drink in the steeping chamber.

6. The hot drink maker of claim 1, wherein the main body of the heating device for making various hot drinks has a section located adjacent to the outlet at the end of the steeping chamber and formed with an aperture for allowing the hot drink to flow out into the adjacent pitcher.

7. The hot drink maker of claim 1, wherein the main body of the heating device for making various hot drinks has an acting side assembled with a water temperature setting button for setting the temperature sensor in the internal water tank and a time setting button for setting the steeping time for the bag containing the raw material of the hot drink in the steeping chamber.

* * * * *